United States Patent
Shitrit et al.

(10) Patent No.: US 11,819,926 B2
(45) Date of Patent: Nov. 21, 2023

(54) CUTTING HEAD HAVING FOUR CUTTING PORTIONS AND TWO CONVEX CLAMPING SURFACES, AND ROTARY CUTTING TOOL

(71) Applicant: ISCAR, LTD., Tefen (IL)

(72) Inventors: Shim'on Shitrit, Kibbutz Metsuba (IL); Hytham Kablan, Bet Jaan (IL)

(73) Assignee: Iscar, Ltd, Tefen (IL)

( * ) Notice: Subject to any disclaimer, the term of this patent is extended or adjusted under 35 U.S.C. 154(b) by 53 days.

(21) Appl. No.: 17/527,638

(22) Filed: Nov. 16, 2021

(65) Prior Publication Data
US 2023/0150036 A1   May 18, 2023

(51) Int. Cl.
*B23B 27/16* (2006.01)
*B23B 51/00* (2006.01)

(52) U.S. Cl.
CPC .......... *B23B 27/16* (2013.01); *B23B 51/0003* (2022.01); *B23B 51/0005* (2022.01)

(58) Field of Classification Search
CPC ............ B23B 2240/04; B23B 2240/36; B23B 2240/00; B23B 2251/02; B23B 2251/204; B23B 2251/04; B23B 51/0003; B23B 51/0005; B23B 27/16; B23C 2240/04; B23C 2240/00; B23C 2210/02; B23C 2210/0442; B23C 2210/203; B23C 5/109
See application file for complete search history.

(56) References Cited

U.S. PATENT DOCUMENTS

| | | |
|---|---|---|
| 5,957,631 A | 9/1999 | Hecht |
| 6,109,841 A | 8/2000 | Johne |
| 6,276,879 B1 | 8/2001 | Hecht |
| 6,582,164 B1 | 6/2003 | McCormick |
| 7,309,196 B2 | 12/2007 | Ruy Frota De Souza |
| 7,360,974 B2 | 4/2008 | Borschert et al. |
| 7,377,730 B2 | 5/2008 | Hecht et al. |

(Continued)

FOREIGN PATENT DOCUMENTS

WO   WO 2018/079489   5/2018

OTHER PUBLICATIONS

International Search Report dated Feb. 24, 2023, issued in PCT counterpart application No. PCT/IL2022/051097.

(Continued)

*Primary Examiner* — Sara Addisu
(74) *Attorney, Agent, or Firm* — Womble Bond Dickinson (US) LLP

(57) ABSTRACT

A cutting head rotatable about a head axis has a cap portion and a rigid mounting protuberance joined to the cap portion. The cap portion has exactly four cutting portions circumferentially alternating with four head flutes and a head base surface facing in an axially rearward direction. The mounting protuberance extends axially rearwardly from the head base surface and has exactly two circumferentially spaced apart convex clamping surfaces. In a cross-section taken in a first horizontal plane perpendicular to the head axis and intersecting the mounting protuberance, only the two clamping surfaces are circumscribed by an imaginary first circle having a first diameter and a center coincident with the head axis. A rotary cutting tool has an elongated tool shank with a head receiving pocket at a forward end thereof and the cutting head of the type described above releasably secured to the head receiving pocket.

25 Claims, 8 Drawing Sheets

(56) References Cited

U.S. PATENT DOCUMENTS

| | | |
|---|---|---|
| 7,467,915 B2 | 12/2008 | De Souza |
| 7,559,382 B2 | 7/2009 | Koch |
| 7,972,094 B2 | 7/2011 | Men et al. |
| 8,021,088 B2 | 9/2011 | Hecht |
| 8,534,966 B2 | 9/2013 | Hecht |
| 8,556,552 B2 | 10/2013 | Hecht |
| 8,668,413 B2 * | 3/2014 | Volokh ................. B23B 31/113 408/239 R |
| 8,784,018 B2 | 7/2014 | Păbel |
| 8,882,413 B2 | 11/2014 | Hecht |
| 8,992,141 B2 | 3/2015 | Hecht et al. |
| 8,992,142 B2 | 3/2015 | Hecht |
| 9,028,180 B2 | 5/2015 | Hecht |
| 10,071,430 B2 | 9/2018 | Frota De Souza Filho et al. |
| 10,173,271 B2 | 1/2019 | Hecht |
| 11,110,521 B2 | 9/2021 | Hecht |
| 2005/0084352 A1 | 4/2005 | Borschert et al. |
| 2009/0116920 A1 | 5/2009 | Bae |
| 2012/0315101 A1 | 12/2012 | Osawa et al. |
| 2015/0266107 A1 | 9/2015 | Gonen et al. |
| 2018/0065191 A1 | 3/2018 | Hecht |
| 2019/0275594 A1* | 9/2019 | Hecht ..................... B23B 51/00 |
| 2019/0375029 A1 | 12/2019 | Katagiri |
| 2020/0108449 A1* | 4/2020 | Brodski .............. B23B 51/0003 |

OTHER PUBLICATIONS

Written Opinion dated Feb. 24, 2023, issued in PCT counterpart application No. PCT/IL2022/051097.

\* cited by examiner

CUTTING HEAD HAVING FOUR CUTTING PORTIONS AND TWO CONVEX CLAMPING SURFACES, AND ROTARY CUTTING TOOL

FIELD OF THE INVENTION

The present invention relates to a rotary cutting tool and a cutting head having four cutting portions releasably secured to a tool shank associated therewith, for use in metal cutting processes in general, and for drilling operations in particular.

BACKGROUND OF THE INVENTION

Within the field of cutting tools used in drilling operations, there are some examples of cutting heads having more than two cutting portions releasably secured to a tool shank associated therewith.

U.S. Pat. No. 10,173,271 discloses a tool shank having a head receiving pocket at a forward end, and a plurality of chip flutes extending rearwardly therefrom along a longitudinal axis. The head receiving pocket has a support surface transverse to the longitudinal axis. A central recess is formed in the support surface and extends rearwardly therefrom. The central recess has a plurality of resiliently displaceable abutment portions circumferentially alternating with and spaced apart by a plurality of intermediate portions. Each abutment portion has a radially inward facing abutment surface, and each intermediate portion has an intermediate surface intersecting two circumferentially adjacent abutment surfaces. A rotary cutting tool includes the shank and a cutting head releasably mounted thereto. The cutting head has a mounting portion provided with a base surface and an engagement member protruding therefrom. In an assembled position, the engagement member is resiliently retained in the central recess against the plurality of abutment surfaces.

U.S. Pat. No. 11,110,521 discloses a cutting head rotatable about a first axis, having a cap portion and a rigid mounting protuberance joined thereto. The cap portion has a plurality of cutting portions circumferentially alternating with a plurality of head chip flutes, and a head base surface facing in an axial rearward direction. The mounting protuberance exhibits rotational symmetry about the first axis, extends axially rearwardly from the head base surface, and has a plurality of circumferentially spaced apart convex clamping surfaces. The plurality of cutting portions define a cutting diameter, the plurality of head chip flutes are inscribed by an imaginary first circle having a first diameter, and the plurality of clamping surfaces are circumscribed by an imaginary second circle having a second diameter. The first diameter is greater than the second diameter, and the second diameter is less than forty percent of the cutting diameter.

It is an object of the present invention to provide an improved cutting head having four cutting portions.

It is also an object of the present invention to provide an improved cutting head having good stability when releasably secured to a tool shank.

It is a further object of the present invention to provide an improved tool shank having an extended useful life.

SUMMARY OF THE INVENTION

In accordance with the present invention, there is provided a cutting head rotatable about a head axis in a first direction of rotation, the head axis establishing an axial forward direction and an axial rearward direction opposite the axial forward direction, the cutting head comprising:
a cap portion having exactly four cutting portions circumferentially alternating with four head flutes, and a head base surface facing in the axial rearward direction,
each cutting portion having a front surface facing in the axial forward direction and intersecting a circumferentially adjacent and rotationally forward head flute with respect to the first direction of rotation to form a radially extending cutting edge, and
a rigid mounting protuberance extending axially rearwardly from the head base surface and having exactly two circumferentially spaced apart convex clamping surfaces,
wherein:
in a cross-section taken in a first horizontal plane perpendicular to the head axis and intersecting the mounting protuberance at the two clamping surfaces, only the two clamping surfaces are circumscribed by an imaginary first circle having a first diameter and a center coincident with the head axis.

Also, in accordance with the present invention, there is provided a rotary cutting tool comprising:
an elongated tool shank having a head receiving pocket at a forward end thereof and four shank flutes extending away from the forward end along a shank axis, and
a cutting head of the type described above releasably secured to the head receiving pocket.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

A first aspect of the present invention relates to a cutting head 20 rotatable about a head axis AH in a first direction of rotation R1, the head axis AH establishing an axial forward direction DF and an axial rearward direction DR opposite to the axial forward direction DF.

In some embodiments of the present invention, the cutting head 20 may preferably be manufactured by form pressing and sintering a cemented carbide, such as tungsten carbide, and may be coated or uncoated.

Figure 1:
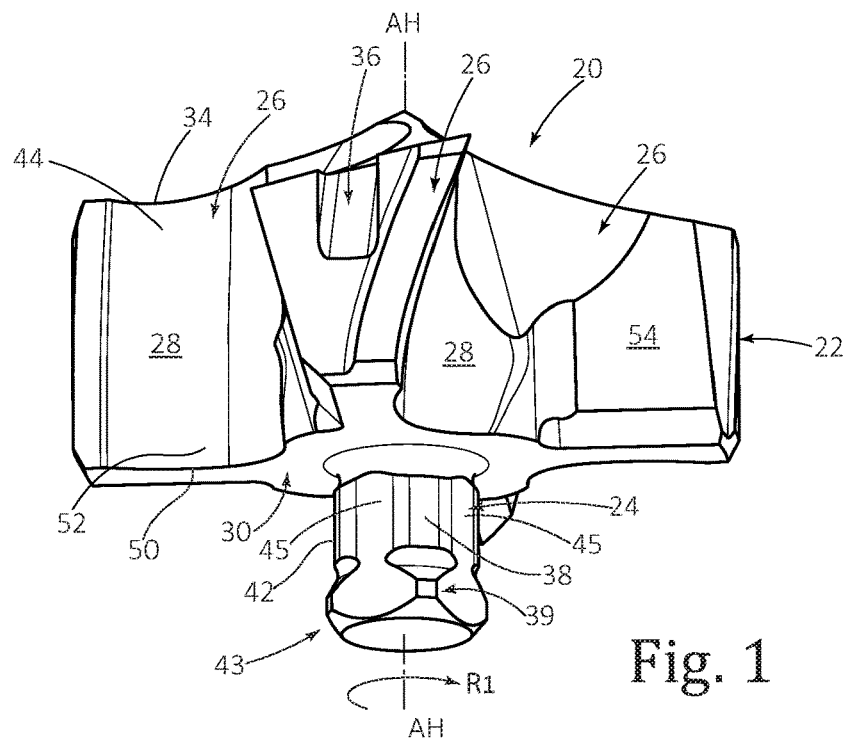
FIG. 1 is a perspective view of a cutting head in accordance with some embodiments of the present invention.
Figure 2:
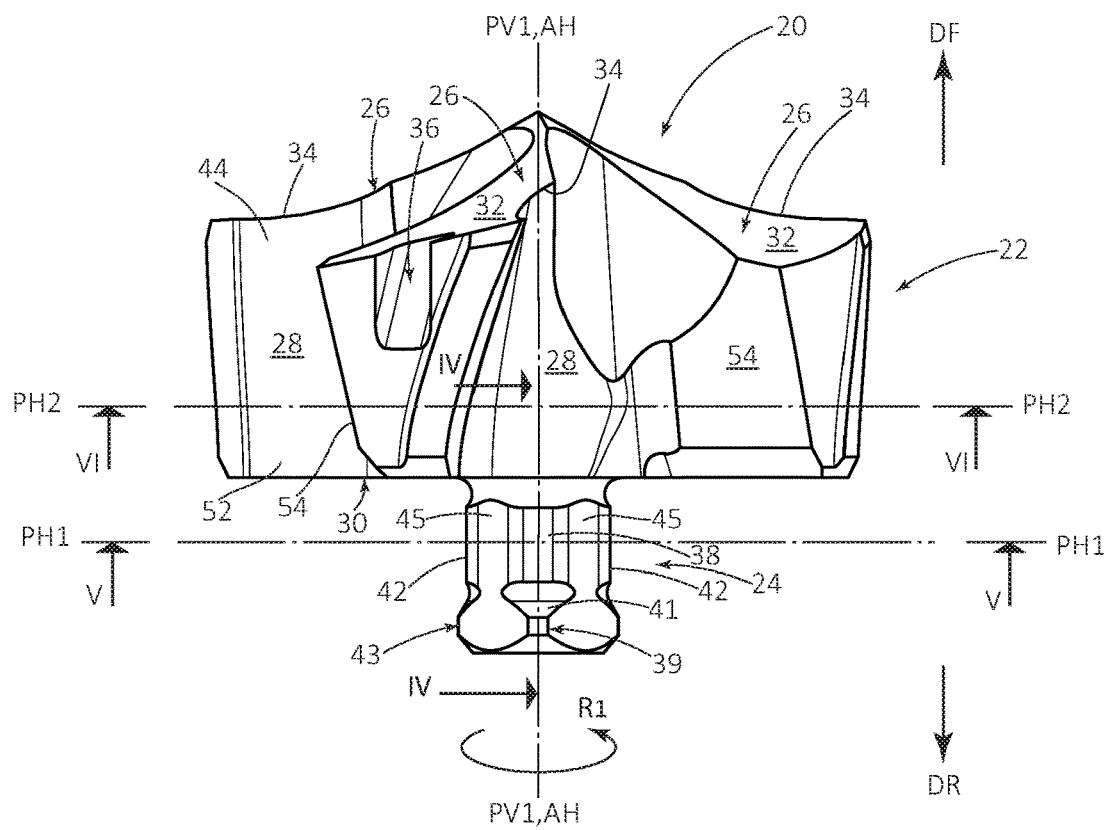
FIG. 2 is a side view of the cutting head shown in FIG. 1.
Figure 3:
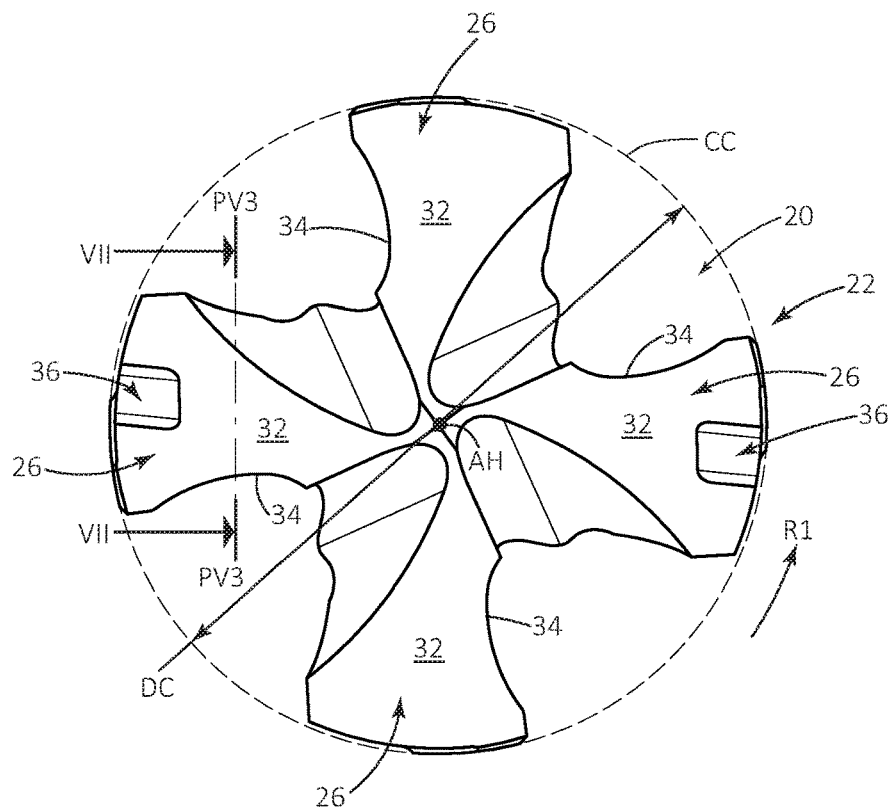
FIG. 3 is a top view of the cutting head shown in FIG. 1.

As shown in FIGS. 1 to 3, the cutting head 20 comprises a cap portion 22 and a rigid mounting protuberance 24 joined to the cap portion 22.

It should be appreciated that the cutting head 20 may be of unitary one-piece construction, and the mounting protuberance 24 may have the same rigidity as the cap portion 22 and be devoid of resiliently displaceable elements.

As seen below, the cap portion 22 has a first plurality of cutting portions 26, being exactly twice the number of a second plurality of convex clamping surfaces 38 provided on the mounting protuberance 24.

As shown in FIGS. 1 to 3, the cap portion 22 has exactly four cutting portions 26 circumferentially alternating with four head flutes 28, and a head base surface 30 facing in the axial rearward direction DR.

Also, as shown in FIGS. 1 to 3, each cutting portion 26 has a front surface 32 facing in the axial forward direction DF, and each front surface 32 intersects a circumferentially adjacent and rotationally forward head flute 28 with respect to the first direction of rotation R1 to form a radially extending cutting edge 34.

In some embodiments of the present invention, the four cutting edges 34 may be identical.

Also, in some embodiments of the present invention, the four cutting edges 34 may be circumferentially equi-spaced about the head axis AH.

Further, in some embodiments of the present invention, apart from a pair of key slots 36 formed in two diametrically opposed cutting portions 26, the cap portion 22 may exhibit 4-fold rotational symmetry about the head axis AH.

As shown in FIG. 3, the four cutting edges 34 may define a cutting diameter DC corresponding to an imaginary cutting circle CC.

It should be appreciated throughout the description and claims, that the four radially outermost points of the four cutting edges 34 define the cutting diameter DC and lie on the imaginary cutting circle CC.

In some embodiments of the present invention, the cutting head 20 may be used for drilling operations.

As shown in FIGS. 1 to 3, the rigid mounting protuberance 24 extends axially rearwardly from the head base surface 30 and has exactly two circumferentially spaced apart convex clamping surfaces 38.

In some embodiments of the present invention, a first vertical plane PV1 containing the head axis AH may intersect the two clamping surfaces 38, and the two clamping surfaces 38 may be described as a pair of diametrically opposed clamping surfaces 38.

Figure 4:
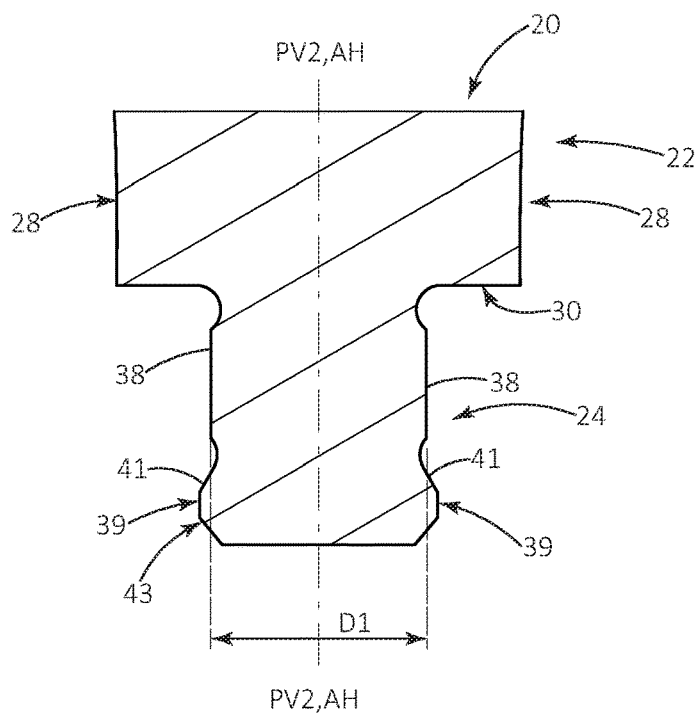
FIG. 4 is a cross-sectional view of the cutting head shown in FIG. 2, taken along the line IV-IV.

Also, in some embodiments of the present invention, the two clamping surfaces 38 may be partially cylindrically shaped, and in a cross-section taken in the first vertical plane PV1, as shown in FIG. 4, the two clamping surfaces 38 may extend parallel to the head axis AH.

In other embodiments of the present invention (not shown), the two clamping surfaces 38 may be partially conically shaped, and in a cross-section taken in a vertical plane containing the head axis AH and intersecting the two clamping surfaces 38, the two clamping surfaces 38 may diverge away from the head axis AH in the axial rearward direction DR. In other words, in the rearward direction of the mounting protuberance 24, there is an increase in diameter size of an imaginary circle circumscribing the two clamping surface 38.

As shown in FIGS. 1 and 2, the mounting protuberance 24 may have at least two circumferentially spaced apart axial stopper portions 39 located axially rearward of the two clamping surfaces 38.

In some embodiments of the present invention, the first vertical plane PV1 may intersect two of the at least two circumferentially spaced apart axial stopper portions 39, and in the cross-section taken in the first vertical plane PV1, as shown in FIG. 4, the said two axial stopper portions 39 may extend radially beyond the two clamping surfaces 38.

In some embodiments of the present invention, each axial stopper portion 39 may have a stopper surface 41 facing in the axial forward direction DF.

Also, in some embodiments of the present invention, the mounting protuberance 24 may have four axial stopper portions 39 circumferentially equi-spaced about the head axis AH forming a bulge 43 at the distal end thereof.

Figure 5:
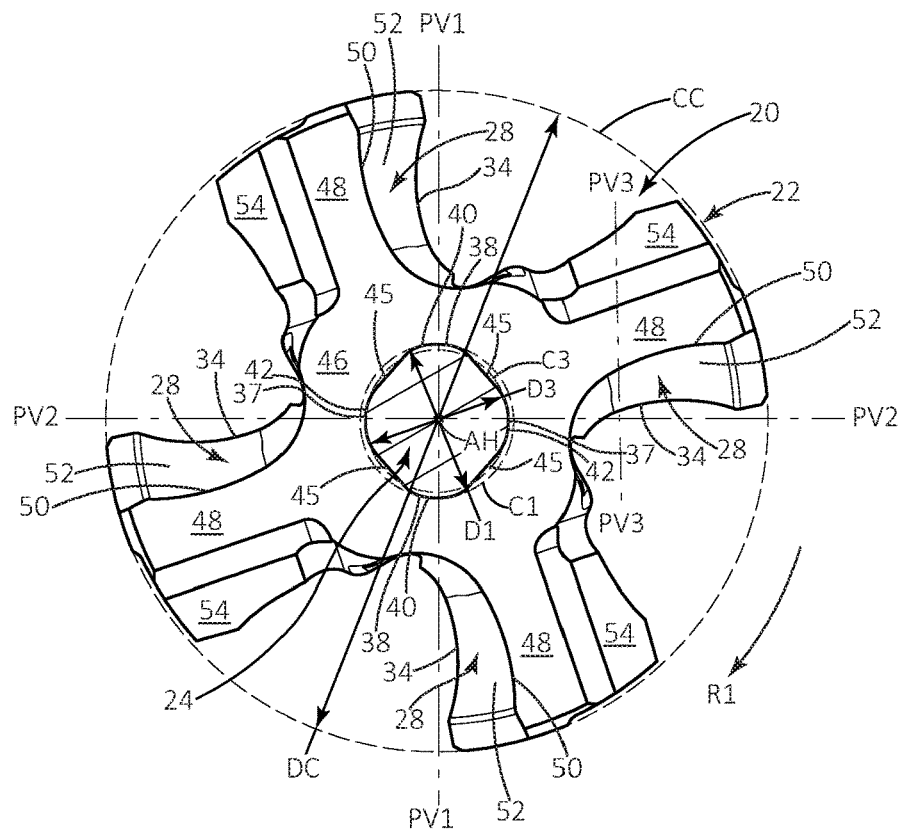
FIG. 5 is a cross-sectional view of the cutting head shown in FIG. 2, taken along the line V-V.

As shown in FIG. 5, in a cross-section taken in a first horizontal plane PH1 perpendicular to the head axis AH and intersecting the mounting protuberance 24 at the two clamping surfaces 38, according to the first aspect of the present invention, only the two clamping surfaces 38 are circumscribed by an imaginary first circle C1 having a first diameter D1 and a center coincident with the head axis AH.

Reverting to FIG. 4 and with reference to FIG. 5, each of the four axial stopper portions 39 extends radially outward of an axial projection of the first imaginary circle C1. In other words, an imaginary circle perpendicular to the head axis AH and having a center coincident therewith, and circumscribing the four axial stopper portions 39, would have a diameter greater than the first diameter D1.

In some embodiments of the present invention, in the cross-section taken in the first horizontal plane PH1, no portion of the mounting protuberance 24 may be located outside the imaginary first circle C1, and it should be appreciated throughout the description and claims, that the imaginary first circle C1 circumscribes the entire mounting protuberance 24 at only the two clamping surfaces 38.

Also, in some embodiments of the present invention, in the cross-section taken in the first horizontal plane PH1, the two clamping surfaces 38 may form two clamping arcs 40 coincident with the imaginary first circle C1.

Further, in some embodiments of the present invention, the first vertical plane PV1 may bisect the two clamping arcs 40 at midpoints thereof.

Yet further, in some embodiments of the present invention, the first vertical plane PV1 may bisect the two clamping surfaces 38.

As shown in FIG. 5, the first diameter D1 may be less than forty percent of the cutting diameter DC, i.e., D1<0.40*DC.

Figure 6:
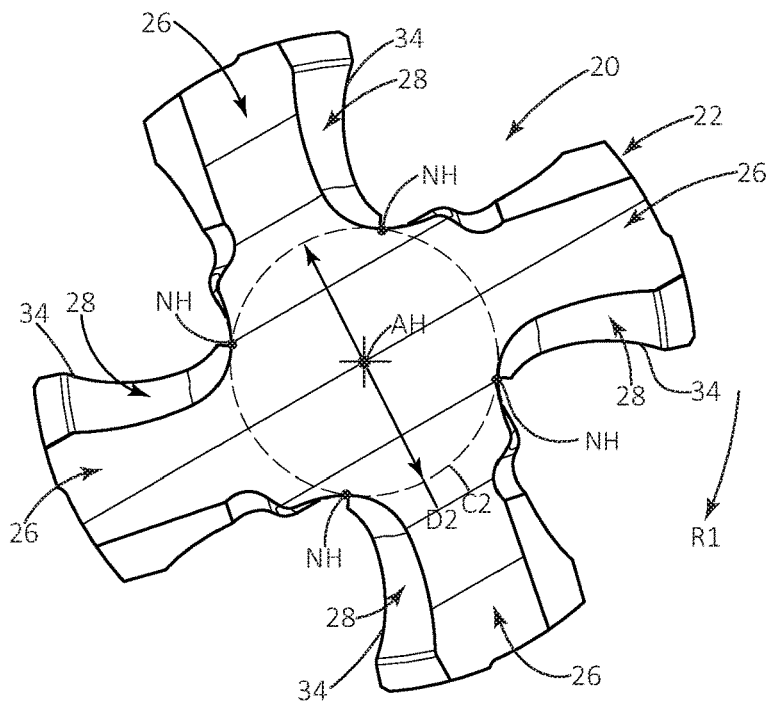
FIG. 6 is a cross-sectional view of the cutting head shown in FIG. 2, taken along the line VI-VI.

As shown in FIG. 6, in a cross-section taken in a second horizontal plane PH2 perpendicular to the head axis AH and intersecting the cap portion 22, the four head flutes 28 are inscribed by an imaginary second circle C2 having a second diameter D2 and a center coincident with the head axis AH, the imaginary second circle C2 passing through four radially innermost head flute points NH, each head flute point NH associated with a corresponding one of the four head flutes 28.

In some embodiments of the present invention, the second diameter D2 may be greater than the first diameter D1, i.e., D2>D1.

As shown in FIGS. 1 to 3, the rigid mounting protuberance 24 may have two circumferentially spaced apart convex guide surfaces 42, and the two guide surfaces 42 may circumferentially alternate with the two clamping surfaces 38.

As shown in FIG. 5, in the cross-section taken in the first horizontal plane PH1, the two guide surfaces 42 may be located inside the imaginary first circle C1.

Also as shown in FIG. 5, in the cross-section taken in the first horizontal plane PH1, the two guide surfaces 42 may be circumscribed by an imaginary third circle C3 having a third diameter D3 and a center coincident with the head axis AH, and the third diameter D3 may be less than the first diameter D1, but greater than eighty-five percent of the first diameter D1, i.e., $D1>D3>0.85*D1$.

It should be appreciated throughout the description and claims, that although the imaginary third circle C3 circumscribes the two guide surfaces 42 in the cross-section taken in the first horizontal plane PH1, the imaginary third circle C3 does not circumscribe the entire mounting protuberance 24, especially the two clamping surfaces 38.

As shown in FIG. 5, in the cross-section taken in the first horizontal plane PH1, the two guide surfaces 42 may form two guide arcs 37 coincident with the imaginary third circle C3.

In some embodiments of the present invention, a second vertical plane PV2 containing the head axis AH may intersect the two guide surfaces 42, and the two guide surfaces 42 may be described as a pair of diametrically opposed guide surfaces 42.

Also, in some embodiments of the present invention, the second vertical plane PV2 may bisect the two guide arcs 37 at midpoints thereof.

Further, in some embodiments of the present invention, the second vertical plane PV2 may bisect the two guide surfaces 42.

As shown in FIG. 5, the first and second vertical planes PV1, PV2 may be mutually perpendicular.

In some embodiments of the present invention, the mounting protuberance 24 may exhibit 2-fold rotational symmetry about the head axis AH.

As shown in FIGS. 1, 2 and 5, the rigid mounting protuberance 24 may have four transitional surfaces 45 circumferentially spaced apart by the two clamping surfaces 38 and the two guide surfaces 42.

In some embodiments of the present invention, each transitional surface 45 may be planar.

Also, in some embodiments of the present invention, each transitional surface 45 may be parallel to the head axis AH.

As shown in FIGS. 1 and 2, a rake surface 44 is disposed on each head flute 28 adjacent its associated cutting edge 34.

Figure 7:
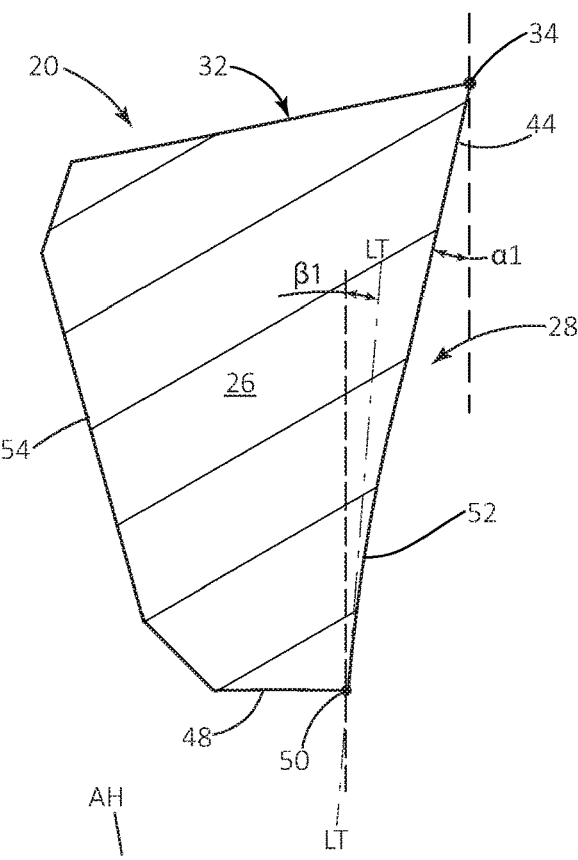
FIG. 7 is a cross-sectional view of the cutting head shown in FIG. 3, taken along the line VII-VII.

As shown in FIG. 7, in a cross-section taken in a third vertical plane PV3 parallel to the head axis AH and transverse to one of the cutting edges 34 along at least a radially outer portion thereof, the rake surface 44 may be inclined at a positive rake angle $\alpha 1$.

It should be appreciated throughout the description and claims, that the term "positive rake angle" refers to an acute external angle formed between the rake surface 44 and an imaginary reference line parallel to the head axis AH and intersecting the associated cutting edge 34.

In some embodiments of the present invention, the rake angle $\alpha 1$ may be greater than seven degrees, i.e., $\alpha 1 > 7°$.

As shown in FIGS. 1 and 5, the head base surface 30 includes a central base region 46 and four radially outer base regions 48, and each head flute 28 intersects one of the four radially outer base regions 48 to form a radially outer base edge 50.

As shown in FIG. 5, the central base region 46 may entirely surround the mounting protuberance 24.

In some embodiments of the present invention, the four radially outer base regions 48 and the central base region 46 may be coplanar.

As shown in FIG. 5, the third vertical plane PV3 intersects one of the radially outer base edges 50.

In some embodiments of the present invention, as shown in FIGS. 1 and 5, a joining surface 52 may be disposed on each head flute 28 adjacent its associated radially outer base edge 50.

As shown in FIG. 7, in the cross-section taken in the third vertical plane PV3, a straight tangent line LT tangential to the joining surface 52 may be inclined at a zero or positive joining angle $\beta 1$.

It should be appreciated throughout the description and claims, that the term "zero joining angle" refers to a configuration in which the straight tangent line LT is parallel to the head axis AH, and the term "positive joining angle" refers to an acute internal angle formed between the straight tangent line LT and an imaginary reference line parallel to the head axis AH and intersecting the associated radially outer base edge 50.

In some embodiments of the present invention, the joining angle $\beta 1$ may be less than the rake angle $\alpha 1$, i.e., $\beta 1 < \alpha 1$.

For embodiments of the present invention in which the joining angle $\beta 1$ is less than the rake angle $\alpha 1$, it should be appreciated that in the cross-section taken in the third vertical plane PV3, as shown in FIG. 7, the joining surface 52 may be concave.

Also, for embodiments of the present invention in which the joining angle $\beta 1$ is less than the rake angle $\alpha 1$, it should be appreciated that the surface area of each of the four radially outer base regions 48 may be advantageously increased, whilst providing each of the four head flutes 28 with an optimally large flute volume.

For such embodiments, it should be appreciated that the increased surface area of each radially outer base region 48 contributes to providing a cutting tool with good stability when the cutting head 20 is releasably secured to a tool shank, and providing each head flute 28 with an optimally large flute volume is of greater importance when the cutting head 20 is configured with four circumferentially spaced apart head flutes 28, compared to an alternative cutting head configuration (not shown), having, for example, only two or three circumferentially spaced apart head flutes.

As shown in FIGS. 1 to 3, each cutting portion 26 may have a torque transmission surface 54 facing opposite the first direction of rotation R1.

For embodiments of the present invention in which each cutting portion 26 has a torque transmission surface 54, and the cap portion 22 substantially exhibits 4-fold rotational symmetry about the head axis AH, it should be appreciated that the cutting head 20 may be mounted on a tool shank in four index positions whereby each of the four torque transmission surfaces 54 makes contact with a different one of four shank drive surfaces, the four torque transmission surfaces 54 and four index positions being exactly twice the number of the second plurality of convex clamping surfaces 38 provided on the mounting protuberance 24.

In some embodiments of the present invention, each torque transmission surface 54 may be located between its associated cutting portion's front surface 32 and one of the radially outer base regions 48.

Also, in some embodiments of the present invention, each torque transmission surface 54 may be planar.

Further, in some embodiments of the present invention, as shown in FIG. 2, each torque transmission surface 54 may be inclined in the first direction of rotation R1 as it extends in the axial rearward direction DR away from its associated cutting portion's front surface 32.

As shown in FIGS. 8 to 13, a second aspect of the present invention relates to a rotary cutting tool 56 having the cutting head 20 secured to an elongated tool shank 58. The tool shank 58 is provided with a head receiving pocket 60 at a forward end 62 thereof and four shank flutes 64 extending away from the forward end 62 along a shank axis AS, and the cutting head 20 is releasably secured to the head receiving pocket 60.

In some embodiments the cutting head 20 may be releasably secured to the head receiving pocket 60 without the requirement of an additional fastening member, such as a clamping screw.

It should be appreciated throughout the description and claims, that when the cutting head 20 is releasably secured to the head receiving pocket 60, and the rotary cutting tool 56 is in a state of assembly, the four shank flutes 64 extend away from the tool shank's forward end 62 in the axial rearward direction DR.

Figure 8:
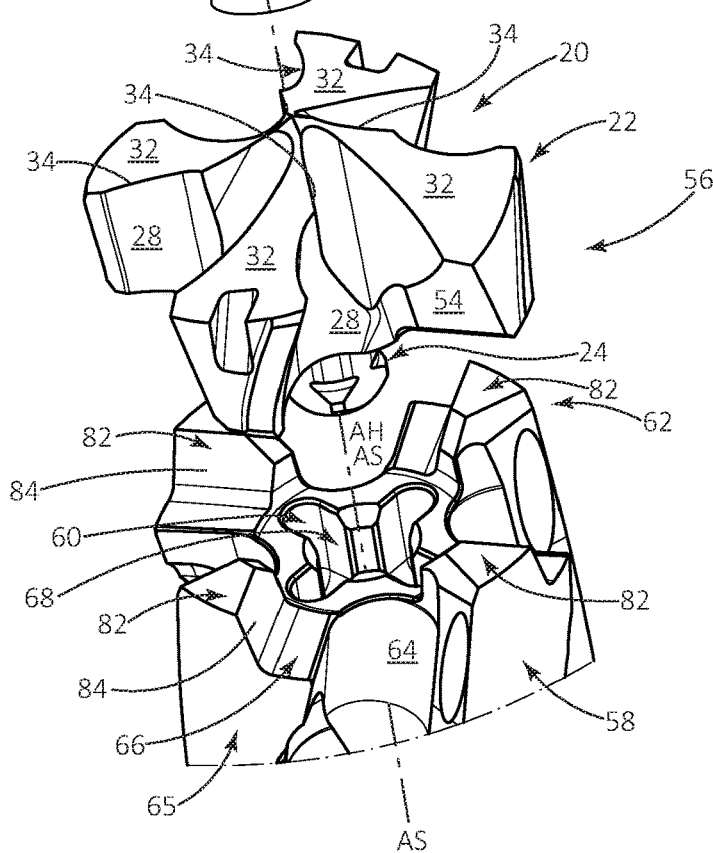
FIG. 8 is an exploded perspective view of a rotary cutting tool in accordance with some embodiments of the present invention.
Figure 9:
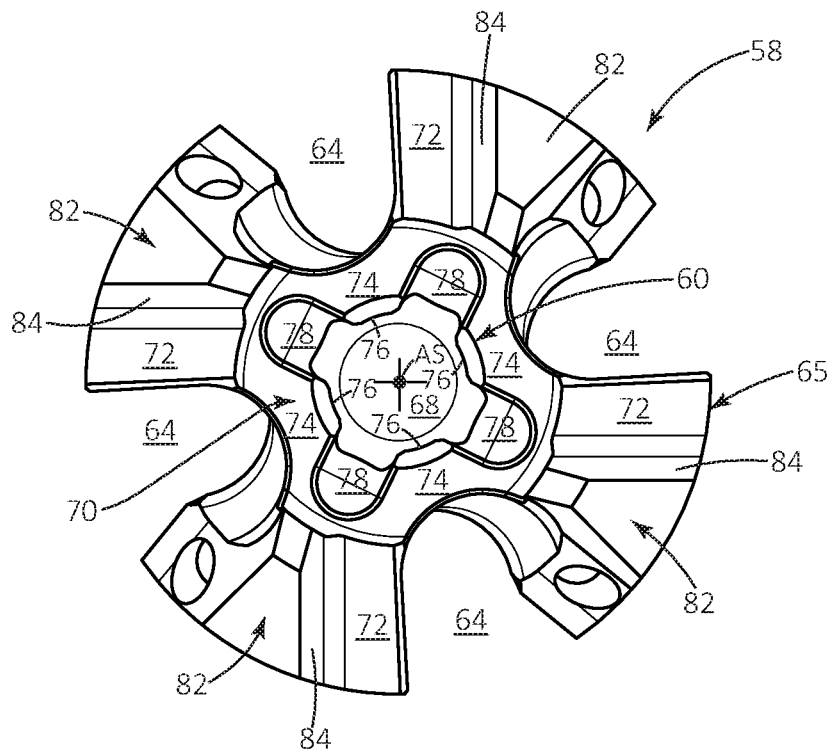
FIG. 9 is an end view of a tool shank in accordance with some embodiments of the present invention.
Figure 10:
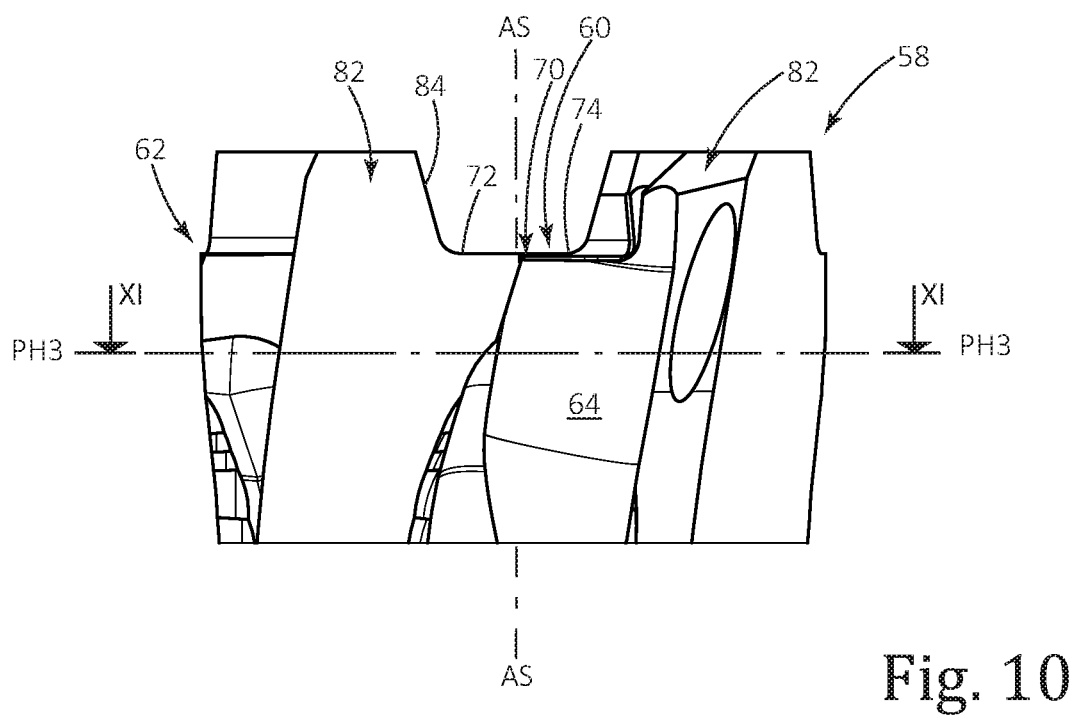
FIG. 10 is a side view of the tool shank shown in FIG. 9.

As shown in FIGS. 8 to 10, the four shank flutes 64 may be formed in a cylindrical shank peripheral surface 65 of the tool shank 58.

In some embodiments of the present invention, the head axis AH may be coincident with the shank axis AS.

Also, in some embodiments of the present invention, the four shank flutes 64 may helically extend along the shank axis AS, and the four head flutes 28 may serve as corresponding extensions of the four shank flutes 64.

Further, in some embodiments of the present invention, the tool shank 58 may preferably be manufactured from tool steel.

Yet further, in some embodiments of the present invention, the rotary cutting tool 56 may be used for drilling operations.

As shown in FIGS. 8 and 9, the head receiving pocket 60 has a shank support surface 66 transverse to the shank axis AS and a central recess 68 formed in the shank support surface 66.

In some embodiments of the present invention, the central recess 68 may not intersect any of the four shank flutes 64.

As shown in FIG. 9, the shank support surface 66 includes a central support region 70 and four radially outer support regions 72.

In some embodiments of the present invention, the central recess 68 may be formed in the central support region 70.

Also, in some embodiments of the present invention, each radially outer support region 72 may intersect the shank peripheral surface 65.

Further, in some embodiments of the present invention, the four radially outer support regions 72 may be coplanar and located axially forward of the central support region 70.

Figure 11:
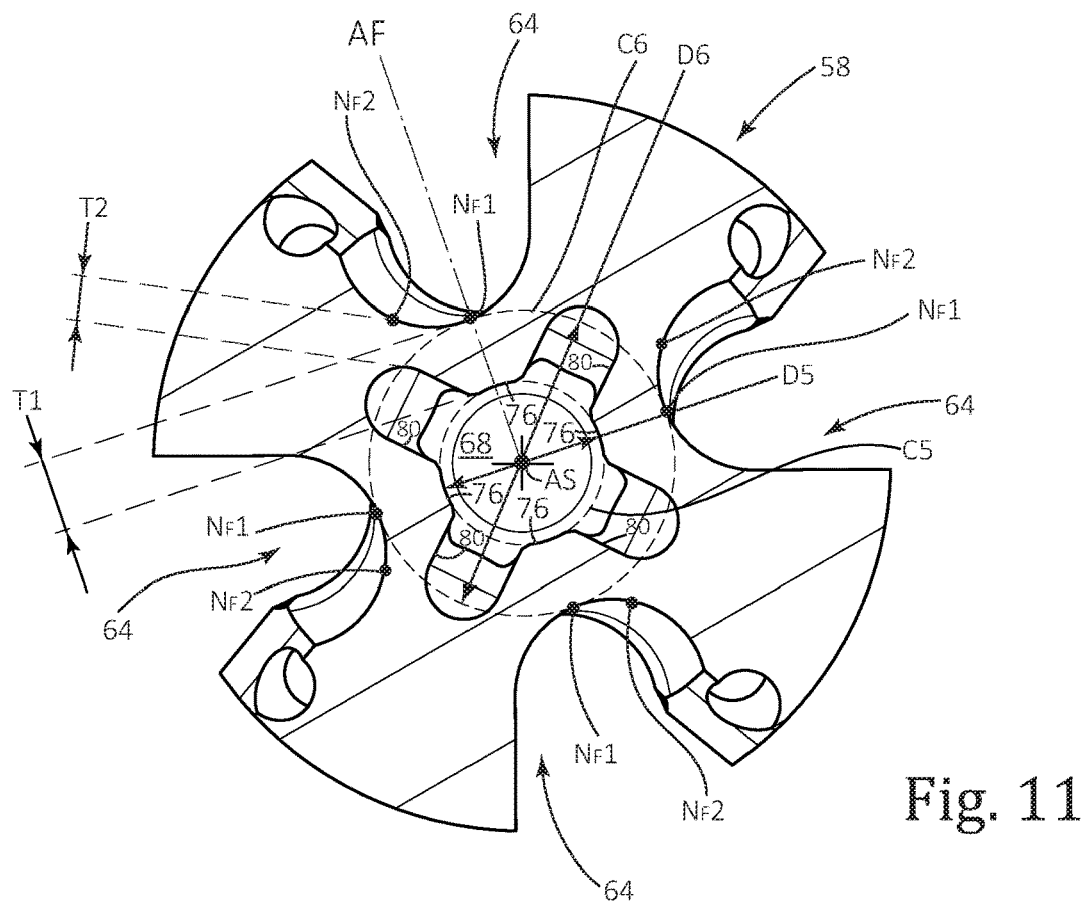
FIG. 11 is a cross-sectional view of the tool shank shown in FIG. 10, taken along the line XI-XI.

As shown in FIGS. 9 and 11, the central recess 68 has four circumferentially spaced apart resiliently displaceable abutment portions 74, each abutment portion 74 having a radially inward facing abutment surface 76.

In some embodiments of the present invention, the four abutment portions 74 may be identical, and the four abutment surfaces 76 may be arranged as two pairs of diametrically opposed abutment surfaces 76. Thus, the tool shank 58 has a third plurality of abutment surfaces 76, being the same in number as the first plurality of cutting portions 26 and exactly twice the number of the second plurality of convex clamping surfaces 38.

In some embodiments of the present invention, the four abutment portions 74 may be independently resiliently displaceable, and for such embodiments it should be appreciated that radial displacement of one of the four abutment portions 74 does not cause radial displacement of any of the other three abutment portions 74.

Also, in some embodiments of the present invention, the central recess 68 may include four intermediate portions 78 which circumferentially alternate with the four abutment portions 74, and each intermediate portion 78 may have an intermediate surface 80 intersecting two circumferentially adjacent abutment surfaces 76.

Further, in some embodiments of the present invention, each intermediate surface 80 may extend radially outwardly from the two circumferentially adjacent abutment surfaces 76.

For embodiments of the present invention in which the four abutment surfaces 76 circumferentially alternate with the four intermediate surfaces 80, the head receiving pocket 60 has a 'circumferentially confined' central recess 68, which improves the resilience of the four abutment portions 74 and extends the useful life of the tool shank 58.

As shown in FIGS. 9 and 11, prior to the cutting head 20 being releasably secured to the head receiving pocket 60, the head receiving pocket 60 may exhibit 4-fold rotational symmetry about the shank axis AS.

Also, prior to the cutting head 20 being releasably secured to the head receiving pocket 60, the tool shank 58 may exhibit 4-fold rotational symmetry about the shank axis AS.

Figure 12:
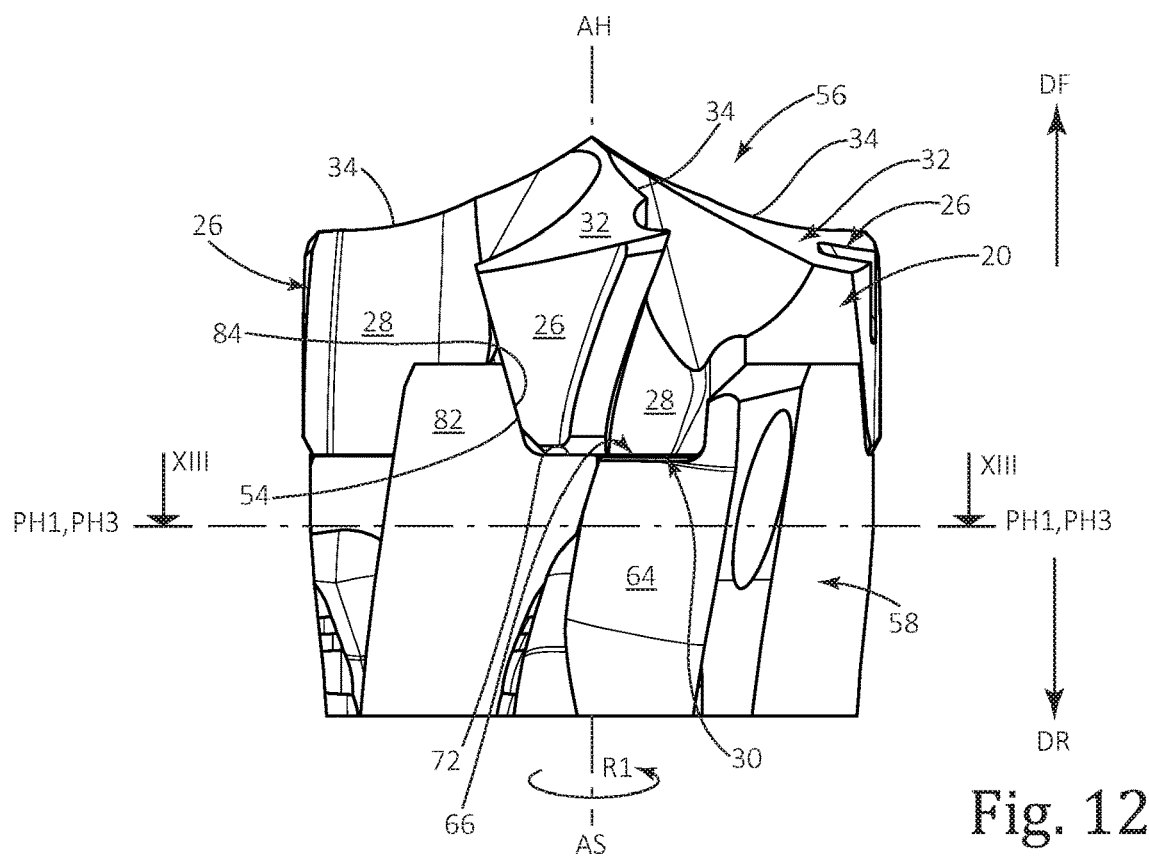
FIG. 12 is a side view of the rotary cutting tool shown in FIG. 8, in a state of clamped assembly.
Figure 13:
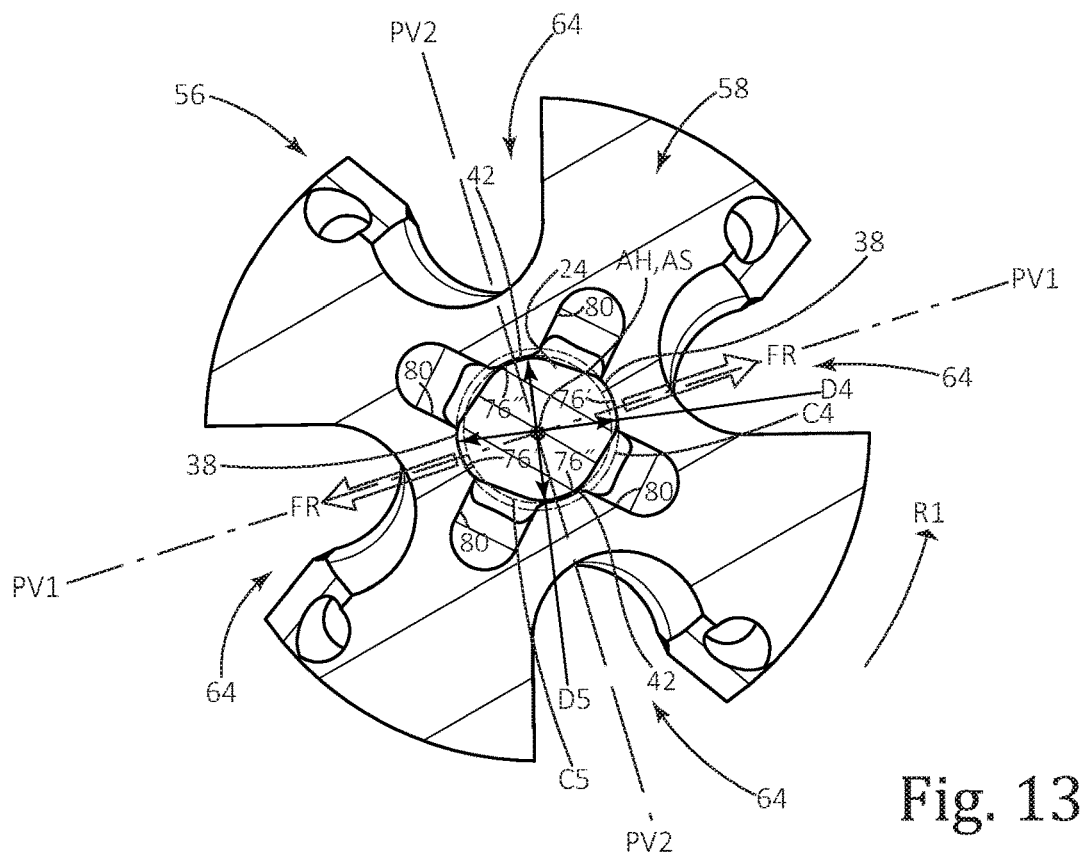
FIG. 13 is a cross-sectional view of the rotary cutting tool shown in FIG. 12, taken along the line XIII-XIII.

According to the second aspect of the present invention, as shown in FIGS. 12 and 13, the mounting protuberance 24 is resiliently retained in the central recess 68 in any one of four index positions, and in each index position:
- the head base surface 30 faces the shank support surface 66,
- the two clamping surfaces 38 make clamping contact with two operative abutment surfaces 76' of the four abutment surfaces 76, and
- no clamping contact occurs between the rigid mounting protuberance 24 and two non-operative abutment surfaces 76" of the four abutment surfaces 76.

It should be appreciated throughout the description and claims, that clamping contact between the two clamping surfaces 38 and the two operative abutment surfaces 76' results in radial outward displacement of the two associated abutment portions 74.

It should also be appreciated throughout the description and claims, that no clamping contact occurs between the rigid mounting protuberance 24 and the two non-operative abutment surfaces 76", and the mounting protuberance's two guide surfaces 42 may face the two non-operative abutment surfaces 76" with minimal spacing therebetween.

In some embodiments of the present invention, in each index position, the head receiving pocket 60 may exhibit 2-fold rotational symmetry about the shank axis AS.

It should be appreciated that the rotary cutting tool's tool shank 58 has two operational configurations, namely, a first operational configuration in which the mounting protuberance 24 of a removably secured cutting head 20 is resiliently retained in the tool shank's central recess 68 in a first or second of the above said four index positions in which a same first pair of diametrically opposed abutment surfaces 76 are operative, and a second operational configuration in which the mounting protuberance 24 of a removably secured cutting head 20 is resiliently retained in the tool shank's central recess 68 in a third or fourth of the above said four index positions in which a same second pair of diametrically opposed abutment surfaces 76 are operative.

In the present rotary cutting tool 56, the tool shank 58 has exactly twice as many radially inward facing abutment surfaces 76 in its central recess 68, as the cutting head 20 has clamping surfaces 38 on its mounting protuberance 24. Thus, in the fully assembled rotary cutting tool 56, in the circumferential direction of the tool shank's central recess 68, only alternate ones of the third plurality of abutment surfaces 76 are operative. More specifically, the second plurality of circumferentially spaced apart convex clamping surfaces 38 on the cutting head's mounting protuberance 24 are in abutment with alternate ones of the third plurality of circumferentially spaced apart and radially inward facing abutment surfaces 76 of the tool shank's central recess 68.

It should also be appreciated that by having two operational configurations, the useful life of the rotary cutting tool's tool shank 58 may be advantageously extended.

It should further be appreciated that visual markings or indications (not shown) may be provided on the tool shank's forward end 62 to enable the first and second pairs of diametrically opposed abutment surfaces 76 to be distinguished from each other.

It should yet further be appreciated that the key slots 36 located on the cutting head's cap portion 22, may provide a visual indication for the position of the two clamping surfaces 38 on the cutting head's mounting protuberance 24, which may be relied upon when selecting the desired index position of the cutting head 20 in the tool shank's central recess 68.

For embodiments of the present invention in which the four abutment portions 74 are independently resiliently displaceable, it should be appreciated that the useful life of the rotary cutting tool's tool shank 58 may be doubled.

It should further be appreciated that during the useful life of each of the tool shank's first and second operational configurations, several cutting heads 20 may be releasably secured to the tool shank's head receiving pocket 60 and used in drilling operations before being replaced after wear.

As shown in FIGS. 12 and 13, when the cutting head 20 is releasably secured to the head receiving pocket 60, and the rotary cutting tool 56 is in a state of clamped assembly, the head base surface 30 may make contact with the shank support surface 66, and apart from the two clamping surfaces 38 making clamping contact with the two operative abutment surfaces 76', no other portion of the mounting protuberance 24 may make clamping contact with the central recess 68.

In some embodiments of the present invention, at least three of the four radially outer base regions 48 may make contact with at least three of the four radially outer support regions 72.

It should be appreciated that during drilling operations, axially rearward cutting forces will typically overcome any inaccuracies associated with the coplanarity of the four radially outer support regions 72, resulting in contact between all four radially outer base regions 48 and all four radially outer support regions 72.

Also, in some embodiments of the present invention, the central base region 46 may be spaced apart from the central support region 70.

As shown in FIG. 13, in a cross-section taken in a third horizontal plane PH3 perpendicular to the shank axis AS and passing through the central recess 68, an imaginary fourth circle C4 having a fourth diameter D4 and a center coincident with the shank axis AS inscribes the two operative abutment surfaces 76', while an imaginary fifth circle C5 having a fifth diameter D5 and a center coincident with the shank axis AS inscribes the two non-operative abutment surfaces 76", and the fourth diameter D4 is greater than the fifth diameter D5, i.e., D4>D5.

It should be appreciated throughout the description and claims, that in the cross-section taken in the third horizontal plane PH3, none of central recess's four abutment portions 74 and four intermediate portions 78 may traverse the imaginary fifth circle C5.

In some embodiments of the present invention, the first and third horizontal planes PH1, PH3 may be coincident, and the first diameter D1 may be greater than the fifth diameter D5, i.e., D1>D5.

Also, for embodiments of the present invention in which the first and third horizontal planes PH1, PH3 are coincident, the first diameter D1 may be equal to the fourth diameter D4, i.e., D1=D4. Restated, the diameter of the outermost portions of the clamping surfaces 38 matches that of the operative abutment surfaces 76'.

Further, for embodiments of the present invention in which the first and third horizontal planes PH1, PH3 are coincident, the third diameter D3 may be less than the fifth diameter D5, i.e., D3<D5. Restated, the diameter of the outermost portions of the guide surfaces 42 is less than that of the non-operative abutment surfaces 76".

For embodiments of the present invention in which the four circumferentially spaced apart resiliently displaceable abutment portions 74 are identical, it should be appreciated that prior to the cutting head 20 being releasably secured to the head receiving pocket 60, as shown in FIG. 11, in the cross-section taken in the third horizontal plane PH3, the imaginary fifth circle C5 inscribes all of the four abutment surfaces 76.

Also, for embodiments of the present invention in which the four circumferentially spaced apart resiliently displaceable abutment portions 74 are identical, it should be appreciated that prior to the cutting head 20 being releasably secured to the head receiving pocket 60, as shown in FIG. 11, in the cross-section taken in the third horizontal plane PH3, the four shank flutes 64 are inscribed by an imaginary sixth circle C6 having a sixth diameter D6 and a center coincident with the shank axis AS at four first flute points $N_F1$.

In some embodiments of the present invention, a radial flute axis AF perpendicular to the shank axis AS and containing one of the four first flute points $N_F1$ may intersect one of the four abutment surfaces 76, and each first flute point $N_F1$ may be located a minimum first wall thickness T1 from its adjacent abutment surface 76 along its associated radial flute axis AF.

Also, in some embodiments of the present invention, the sixth diameter D6 may be between ninety percent and one hundred and ten percent of the second diameter D2, i.e. $D2*0.90<D6<D2*1.10$.

As shown in FIG. 11, in the cross-section taken in the third horizontal plane PH3, prior to the cutting head 20 being releasably secured to the head receiving pocket 60, each shank flute 64 has a second flute point $N_F2$ spaced apart from the first flute point $N_F1$ and located a minimum second wall thickness T2 from its adjacent intermediate surface 80.

In some embodiments of the present invention, the minimum second wall thickness T2 may be equal to or less than the minimum first wall thickness T1, i.e. T2<T1.

For embodiments of the present invention in which the minimum second wall thickness T2 is equal to or less than the minimum first wall thickness T1, it should be appreciated that the close proximity of each shank flute 64 to its adjacent intermediate surface 80 is a main parameter for regulating the resilience of the associated abutment portion 74.

As shown in FIGS. 8 to 10, the tool shank's forward end 62 may have four drive protuberances 82 protruding from the shank support surface 66, and each drive protuberance 82 may have a drive surface 84 adjacent one of the radially outer support regions 72 facing in the first direction of rotation R1.

In some embodiments of the present invention, each drive surface 84 may intersect the shank peripheral surface 65.

When the cutting head 20 is releasably secured to the head receiving pocket 60, and the rotary cutting tool 56 is in a state of clamped assembly, as shown in FIG. 12, at least two of the four drive surfaces 84 may make contact with at least two of the four torque transmission surfaces 54.

By virtue of clamping contact occurring between the two clamping surfaces 38 and the two operative abutment surfaces 76' and no clamping contact between the rigid mounting protuberance 24 and the two non-operative abutment surfaces 76", it should be appreciated that the tool shank's forward end 62 may undergo very slight torsional twisting, which may result in only two diametrically opposed drive surfaces 84 of the four drive surfaces 84 making contact with two diametrically opposed torque transmission surfaces 54 of the four torque transmission surfaces 54, although during drilling operations, rotational cutting forces will typically overcome the said slight torsional twisting, resulting in contact between all four drive surfaces 84 and all four torque transmission surfaces 54.

In some embodiments of the present invention, the four drive surfaces 84 and the four torque transmission surfaces 54 may be correspondingly inclined with respect to the first direction of rotation R1.

By configuring each drive surface 84 to be slanted away from the first direction of rotation R1 as it extends away from its associated radially outer support region 72, as shown in FIG. 12, it should be appreciated that a component of the rotational cutting forces is directed axially rearwardly and the robustness of the four drive protuberances 82 is increased.

Figure 14:
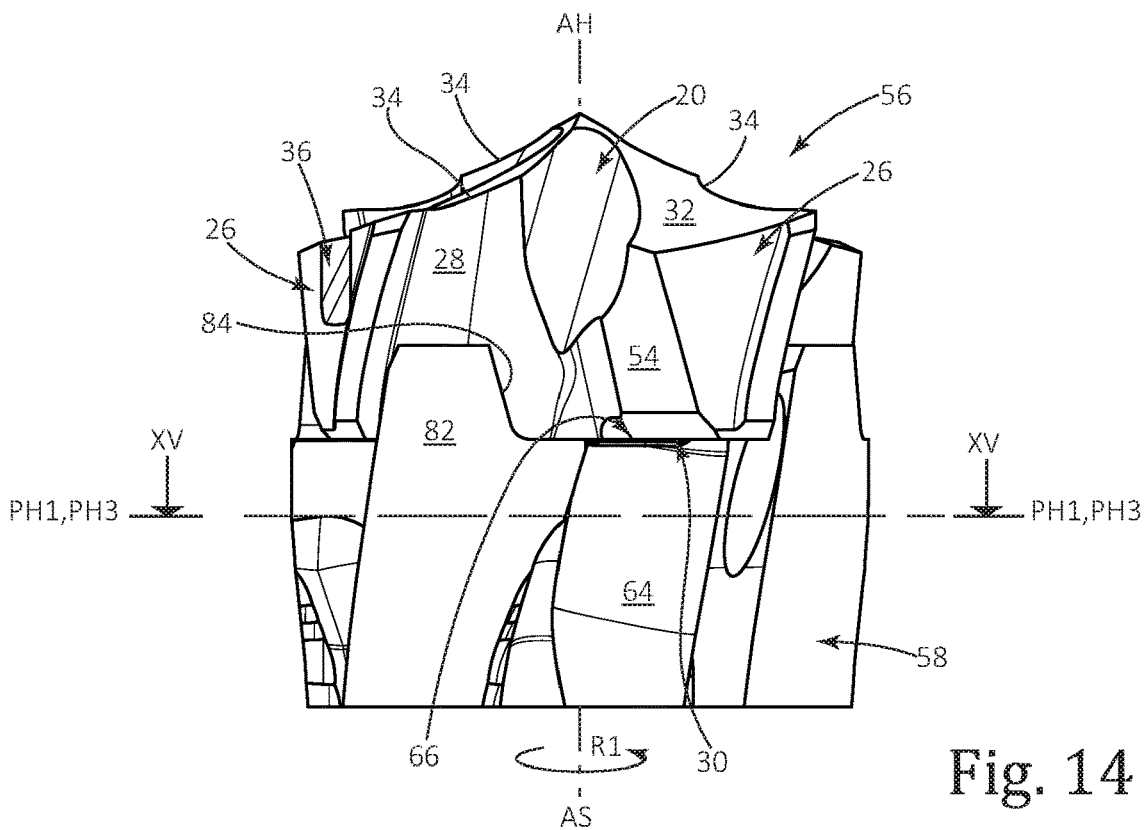
FIG. 14 is a side view of the rotary cutting tool shown in FIG. 8, in a state of unclamped assembly.

The present invention further relates to a method of assembling the rotary cutting tool 56, comprising the steps of:
  a) orienting the head base surface 30 to face the shank support surface 66;
  b) aligning the head axis AH with the shank axis AS;
  c) rotationally aligning the two clamping surfaces 38 with two of the four intermediate portions 78;
  d) inserting the mounting protuberance 24 into the central recess 68, until the head base surface 30 makes contact with the shank support surface 66, as shown in FIG. 14; and
  e) rotating the cutting head 20 about its head axis AH opposite the first direction of rotation R1, until the two clamping surfaces 38 are resiliently retained against two operative abutment surfaces 76' of the four abutment surfaces 76, as shown in FIG. 12.

Figure 15:
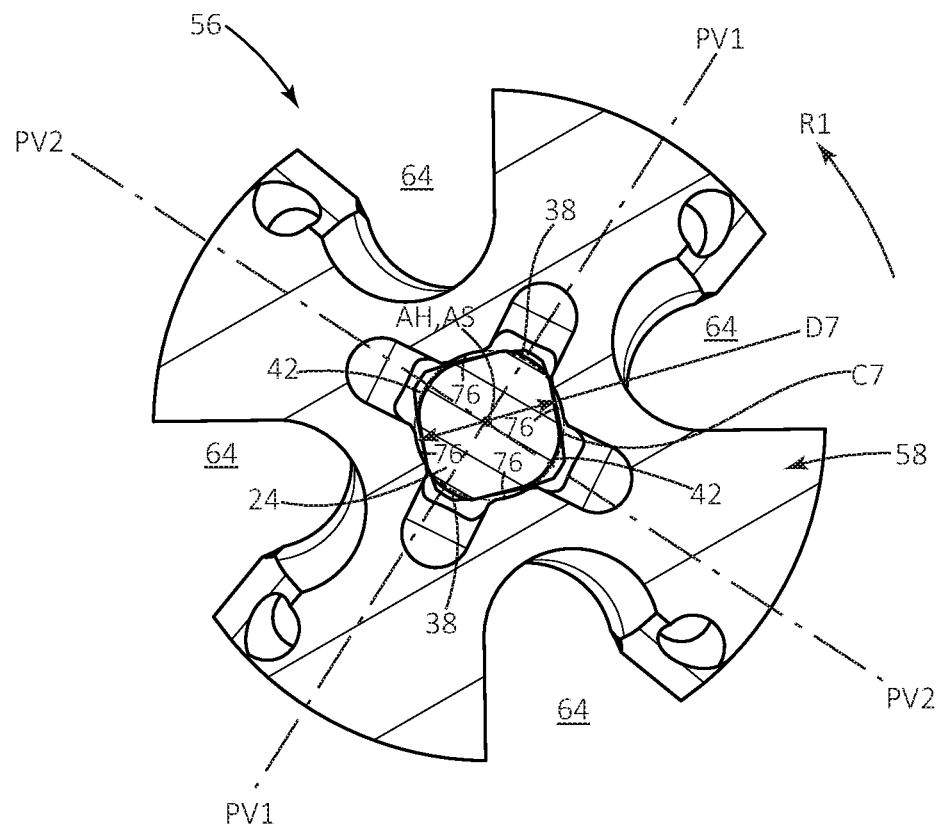
FIG. 15 is a cross-sectional view of the rotary cutting tool shown in FIG. 14, taken along the line XV-XV.

In some embodiments of the present invention, in step d), the rotary cutting tool 56 is in a state of unclamped assembly whereby none of the four abutment portions 74 are being resiliently displaced, and in the cross-section taken in the third horizontal plane PH3, as shown in FIG. 15, an imaginary seventh circle C7 having a seventh diameter D7 and a center coincident with the shank axis AS may inscribe all of the four abutment surfaces 76.

For embodiments of the present invention in which the first and third horizontal planes PH1, PH3 are coincident, the first diameter D1 may be greater than the seventh diameter D7, i.e., D1>D7, although due to the two clamping surfaces 38 being rotationally aligned with two of the four intermediate portions 78, no radially outward forces FR are being applied to any of the four abutment portions 74 and the head receiving pocket 60 has a configuration identical to that prior to the cutting head 20 being releasably secured thereto.

Also, in some embodiments of the present invention, in step d), the head receiving pocket 60 may exhibit 4-fold rotational symmetry about the shank axis AS.

It should be appreciated that step e) is typically performed by using an assembly tool (not shown) which engages the cutting head's key slots 36.

In some embodiments of the present invention, in step e), the cutting head 20 may be rotated by approximately 45 degrees about its head axis AH relative to the tool shank's central recess 68, until the rotary cutting tool 56 achieves a state of clamped assembly.

It should also be appreciated that step e) is typically performed until at least two of the four drive surfaces 84 make contact with at least two of the four torque transmission surfaces 54.

Also, in some embodiments of the present invention, in step e), the two abutment portions 74 associated with the two operative abutment surfaces 76' are being resiliently displaced, and in the cross-section taken in the third horizontal plane PH3, as shown in FIG. 13, the imaginary fourth circle C4 inscribes the two operative abutment surfaces 76' and the fourth diameter D4 is greater than the seventh diameter D7, i.e., D4>D7.

It should further be appreciated in step e), that radially outward forces FR are being applied to the said two abutment portions 74 associated with the two operative abutment surfaces 76' by the two clamping surfaces 38.

Further, in some embodiments of the present invention, in step e), the two abutment portions 74 associated with the two non-operative abutment surfaces 76" are not being resiliently displaced, and in the cross-section taken in the third horizontal plane PH3, as shown in FIG. 13, the imaginary fifth circle C5 inscribes the two non-operative abutment surfaces 76" and the fifth diameter D5 is equal to the seventh diameter D7, i.e., D5=D7.

It should yet further be appreciated in step e), that no radially outward forces FR are being applied to the said two abutment portions 74 associated with the two non-operative abutment surfaces 76".

Yet further, in some embodiments of the present invention, in step e), the head receiving pocket 60 may exhibit 2-fold rotational symmetry about the shank axis AS.

Although the present invention has been described to a certain degree of particularity, it should be understood that various alterations and modifications could be made without departing from the scope of the invention as hereinafter claimed.

What is claimed is:

1. A cutting head (20) rotatable about a head axis (AH) in a first direction of rotation (R1), the head axis (AH) establishing an axial forward direction (DF) and an axial rearward direction (DR) opposite the axial forward direction (DF), the cutting head comprising:
  a cap portion (22) having exactly four cutting portions (26) circumferentially alternating with four head flutes (28), and a head base surface (30) facing in the axial rearward direction (DR), each cutting portion (26) having a front surface (32) facing in the axial forward direction (DF) and intersecting a circumferentially adjacent and rotationally forward head flute (28) with respect to the first direction of rotation (R1) to form a radially extending cutting edge (34), and a rigid mounting protuberance (24) extending axially rearwardly from the head base surface (30) and having exactly two circumferentially spaced apart convex clamping surfaces (38), wherein:

each of the four cutting portions (26) has a corresponding torque transmission surface (54) facing opposite the first direction of rotation (R1); and in a cross-section taken in a first horizontal plane (PH1) perpendicular to the head axis (AH) and intersecting the mounting protuberance (24) at the two clamping surfaces (38), only the two clamping surfaces (38) are circumscribed by an imaginary first circle (C1) having a first diameter (D1) and a center coincident with the head axis (AH).

2. The cutting head (20) according to claim 1, wherein: the four cutting edges (34) are identical.

3. The cutting head (20) according to claim 1, wherein: the four cutting edges (34) are circumferentially equi-spaced about the head axis (AH).

4. The cutting head (20) according to claim 1, wherein: the mounting protuberance (34) exhibits 2-fold rotational symmetry about the head axis (AH).

5. The cutting head (20) according to claim 1, wherein, in the cross-section taken in the first horizontal plane (PH1): the two clamping surfaces (38) form two clamping arcs (40) coincident with the imaginary first circle (C1).

6. The cutting head (20) according to claim 1, wherein: the rigid mounting protuberance (24) has two circumferentially spaced apart convex guide surfaces (42), the two guide surfaces (42) circumferentially alternate with the two clamping surfaces (38), and in the cross-section taken in the first horizontal plane (PH1), the two guide surfaces (42) are located inside the imaginary first circle (C1).

7. The cutting head (20) according to claim 6, wherein, in the cross-section taken in the first horizontal plane (PH1): the two guide surfaces (42) are circumscribed by an imaginary third circle (C3) having a third diameter (D3) and a center coincident with the head axis (AH), and the third diameter (D3) is less than the first diameter (D1), but greater than eighty-five percent of the first diameter (D1).

8. The cutting head (20) according to claim 7, wherein, in the cross-section taken in the first horizontal plane (PH1): the two guide surfaces (42) form two guide arcs (37) coincident with the imaginary third circle (C3).

9. The cutting head (20) according to claim 1, wherein: the mounting protuberance (24) has four circumferentially spaced apart axial stopper portions (39) located axially rearward of the two clamping surfaces (38), and each of the four axial stopper portions (39) extends radially outward of an axial projection of the first imaginary circle (C1) circumscribing the two clamping surfaces (38).

10. The cutting head (20) according to claim 1, wherein, in a cross-section taken in a second horizontal plane (PH2) perpendicular to the head axis (AH) and intersecting the cap portion (22):

the four head flutes (28) are inscribed by an imaginary second circle (C2) having a second diameter (D2) and a center coincident with the head axis (AH), the imaginary second circle (C2) passing through four radially innermost head flute points (NH), each head flute point (NH) associated with a corresponding one of the four head flutes (28), and the second diameter (D2) is greater than the first diameter (D1).

11. The cutting head (20) according to claim 1, wherein: the four cutting edges (34) define a cutting diameter (DC) corresponding to a cutting circle (CC), the first diameter (D1) is less than forty percent of the cutting diameter (DC).

12. The cutting head (20) according to claim 1, wherein: a rake surface (44) is disposed on each head flute (28) adjacent its associated cutting edge (34), and in a cross-section taken in a third vertical plane (PV3) parallel to the head axis (AH) and transverse to one of the cutting edges (34) along at least a radially outer portion thereof, the rake surface (44) is inclined at a positive rake angle (al).

13. The cutting head (20) according to claim 12, wherein: the head base surface (30) includes a central base region (46) and four radially outer base regions (48), each head flute (28) intersects one of the four radially outer base regions (48) to form a radially outer base edge (50), and the third vertical plane (PV3) intersects one of the radially outer base edges (50).

14. The cutting head (20) according to claim 13, wherein: a joining surface (52) is disposed on each head flute (28) adjacent its associated radially outer base edge (50), in the cross-section taken in the third vertical plane (PV3), a straight tangent line (LT) tangential to the joining surface (52) is inclined at a zero or positive joining angle ((31), and the joining angle ((31) is less than the rake angle (al).

15. A rotary cutting tool (56) comprising:
an elongated tool shank (58) having a head receiving pocket (60) at a forward end (62) thereof and four shank flutes (64) extending away from the forward end (62) along a shank axis (AS), and a cutting head (20) releasably secured to the head receiving pocket (60), the cutting head being rotatable about a head axis (AH) in a first direction of rotation (R1), the head axis (AH) establishing an axial forward direction (DF) and an axial rearward direction (DF) opposite the axial forward direction (DF), the cutting head comprising:

a cap portion (22) having exactly four cutting portions (26) circumferentially alternating with four head flutes (28), and a head base surface (30) facing in the axial rearward direction (DR), each cutting portion (26) having a front surface (32) facing in the axial forward direction (DF) and intersecting a circumferentially adjacent and rotationally forward head flute (28) with respect to the first direction of rotation (R1) to form a radially extending cutting edge (34), and a rigid mounting protuberance (24) extending axially rearwardly from the head base surface (30) and having exactly two circumferentially spaced apart convex clamping surfaces (38), wherein:

in a cross-section taken in a first horizontal plane (PH1) perpendicular to the head axis (AH) and intersecting the mounting protuberance (24) at the two clamping surfaces (38), only the two clamping surfaces (38) are circumscribed by an imaginary first circle (C1) having a first diameter (D1) and a center coincident with the head axis (AH);

wherein:

the head receiving pocket (60) has a shank support surface (66) transverse to the shank axis (AS) and a central recess (68) formed in the shank support surface (66), the central recess (68) has four circumferentially spaced apart resiliently displaceable abutment portions (74), each abutment portion (74) having a radially inward facing abutment surface (76), the mounting protuberance (24) is resiliently retained in the central recess (68) in any one of four index positions, and in each index position:

the head base surface (30) faces the shank support surface (66), the two clamping surfaces (38) make clamping contact with two operative abutment surfaces (76') of the four abutment surfaces (76), and no clamping contact occurs between the rigid mounting protuberance (24) and two non-operative abutment surfaces (76") of the four abutment surfaces (76).

16. The rotary cutting tool (56) according to claim 15, wherein:

the four abutment portions (74) are independently resiliently displaceable.

17. The rotary cutting tool (56) according to claim 15, wherein:

the rigid mounting protuberance (24) has two circumferentially spaced apart convex guide surfaces (42), the two guide surfaces (42) circumferentially alternate with the two clamping surfaces (38), in the cross-section taken in the first horizontal plane (PH1), the two guide surfaces (42) are located inside the imaginary first circle (C1), and the two guide surfaces (42) face the two non-operative abutment surfaces (76').

18. The rotary cutting tool (56) according to claim 15, wherein:

the head base surface (30) makes contact with the shank support surface (66), and apart from the two clamping surfaces (38) making clamping contact with the two operative abutment surfaces (76'), no other portion of the mounting protuberance (24) makes clamping contact with the central recess (68).

19. The rotary cutting tool (56) according to claim 18, wherein:

the head base surface (30) includes a central base region (46) and four radially outer base regions (48), the shank support surface (66) includes a central support region (70) and four radially outer support regions (72), and at least three of the four radially outer base regions (48) make contact with at least three of the four radially outer support regions (72).

20. The rotary cutting tool (56) according to claim 15, wherein, in a cross-section taken in a third horizontal plane (PH3) perpendicular to the shank axis (AS) and passing through the central recess (68):

an imaginary fourth circle (C4) having a fourth diameter (D4) and a center coincident with the shank axis (AS) inscribes the two operative abutment surfaces (76'), an imaginary fifth circle (C5) having a fifth diameter (D5) and a center coincident with the shank axis (AS) inscribes the two non-operative abutment surfaces (76"), and the fourth diameter (D4) is greater than the fifth diameter (D5).

21. The rotary cutting tool (56) according to claim 20, wherein:

the first and third horizontal planes (PH1, PH3) are coincident, and the first diameter (D1) is greater than the fifth diameter (D5).

22. The rotary cutting tool (56) according to claim 20, wherein:

the first and third horizontal planes (PH1, PH3) are coincident, and the first diameter (D1) is equal to the fourth diameter (D4).

23. A method of assembling the rotary cutting tool (56) according to claim 15, wherein the central recess (68) further comprises four intermediate portions (78) which circumferentially alternate with the four abutment portions (74); and the method comprises:

a) orienting the head base surface (30) to face the shank support surface (66);

b) aligning the head axis (AH) with the shank axis (AS);

c) rotationally aligning the two clamping surfaces (38) with two of the four intermediate portions (78);

d) inserting the mounting protuberance (24) into the central recess (68), until the head base surface (30) makes contact with the shank support surface (66); and e) rotating the cutting head (20) about its head axis (AH) opposite the first direction of rotation (R1), until the two clamping surfaces (38) are resiliently retained against two operative abutment surfaces (76') of the four abutment surfaces (76).

24. The rotary cutting tool (56) according to claim 15, wherein:

each cutting portion (26) has a torque transmission surface (54) facing opposite the first direction of rotation (R1).

25. A cutting head (20) rotatable about a head axis (AH) in a first direction of rotation (R1), the head axis (AH) establishing an axial forward direction (DF) and an axial rearward direction (DR) opposite the axial forward direction (DF), the cutting head comprising:

a cap portion (22) having exactly four cutting portions (26) circumferentially alternating with four head flutes (28), and a head base surface (30) facing in the axial rearward direction (DR), each cutting portion (26) having a front surface (32) facing in the axial forward direction (DF) and intersecting a circumferentially adjacent and rotationally forward head flute (28) with respect to the first direction of rotation (R1) to form a radially extending cutting edge (34), and a rigid mounting protuberance (24) extending axially rearwardly from the head base surface (30) and having exactly two circumferentially spaced apart convex clamping surfaces (38), wherein:

each head flute (28) extends rearwardly from an associated radially extending cutting edge (34) and intersects the axially rearward facing head base surface (30); and in a cross-section taken in a first horizontal plane (PH1) perpendicular to the head axis (AH) and intersecting the mounting protuberance (24) at the two clamping surfaces (38), only the two clamping surfaces (38) are circumscribed by an imaginary first circle (C1) having a first diameter (D1) and a center coincident with the head axis (AH).

\* \* \* \* \*